UNITED STATES PATENT OFFICE.

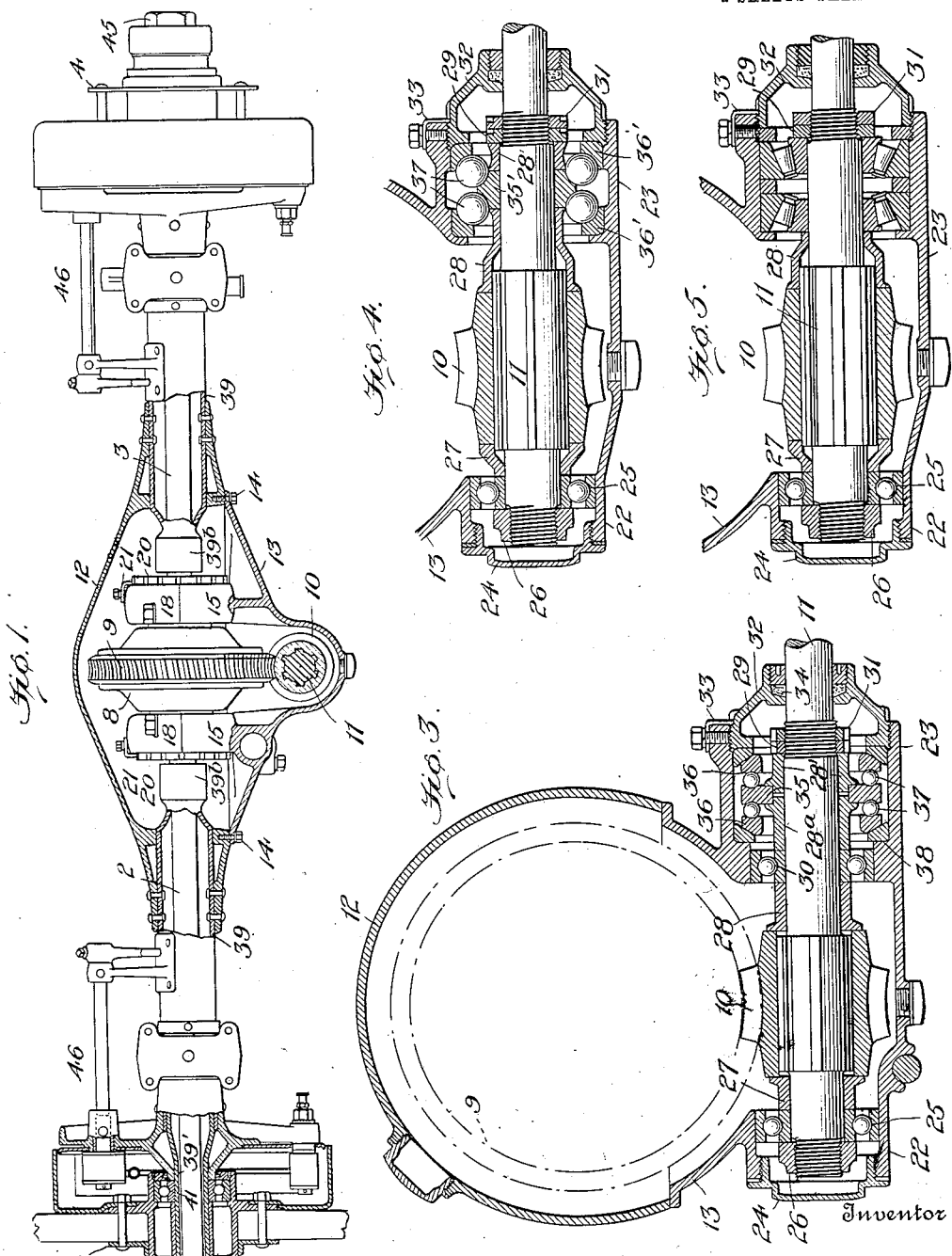

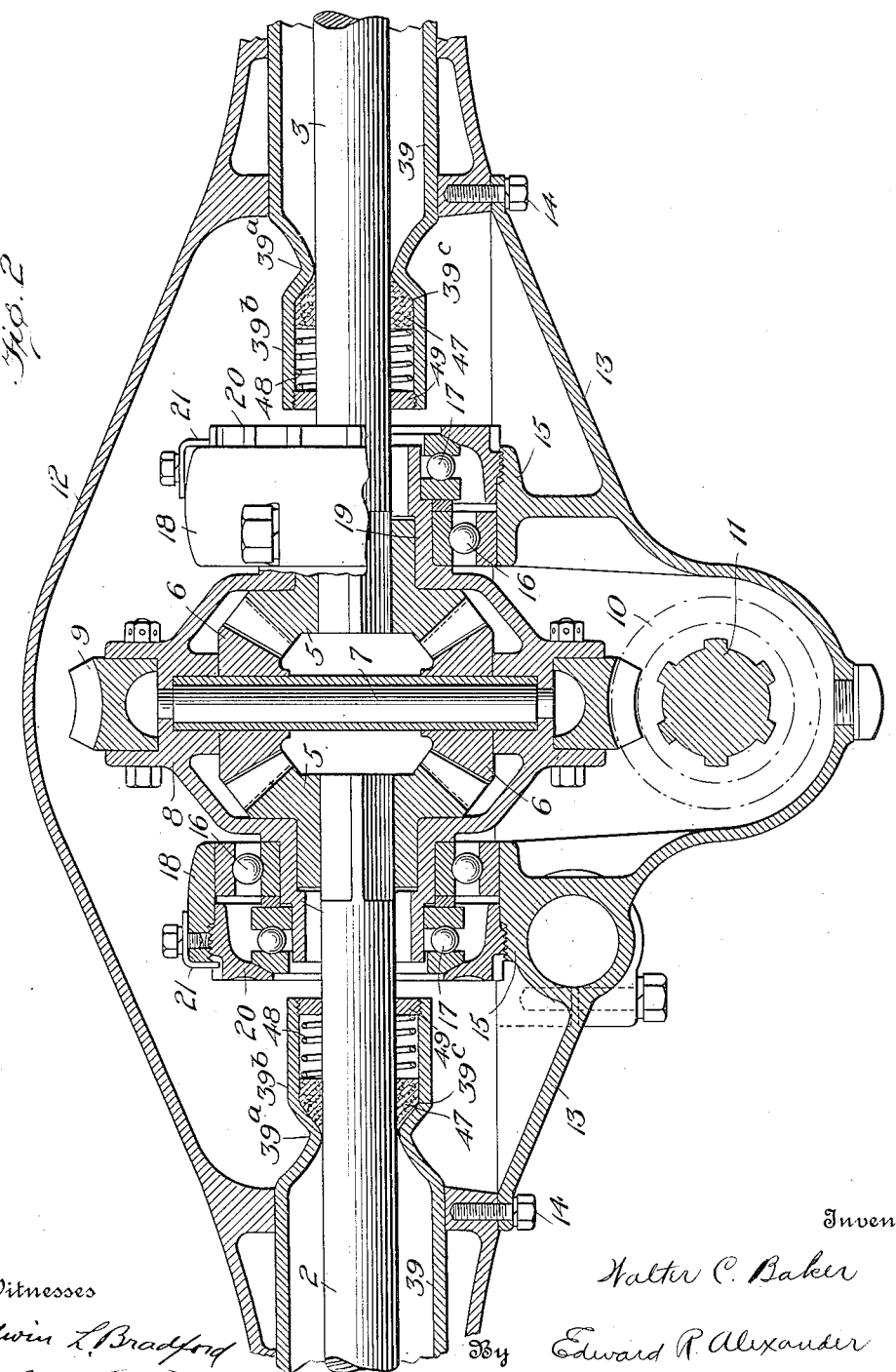

WALTER C. BAKER, OF CLEVELAND, OHIO.

POWER-TRANSMITTING MECHANISM.

1,110,033.  Specification of Letters Patent.  Patented Sept. 8, 1914.

Application filed March 11, 1912, Serial No. 682,951. Renewed May 9, 1914. Serial No. 837,581.

*To all whom it may concern:*

Be it known that I, WALTER C. BAKER, a citizen of the United States, residing at Cleveland, in the county of Cuyahoga and State of Ohio, have invented certain new and useful Improvements in and Relating to Power-Transmitting Mechanism, of which the following is a specification.

This invention relates to improvements in power transmitting mechanism. More particularly it has to do with the mounting of worm gear driving mechanism.

It has for its object to provide for the efficient and durable mounting of a worm and worm gear, more particularly where the worm gear drives suitable differential mechanism for imparting differential motion to two alined shaft sections, such for example as are used in drive axles for motor cars.

Another object of my invention is to provide against the lubricant working out of the chamber in which the power transmitting gearing is mounted and being discharged from the outer ends of the axle tubes.

For the purpose of illustrating my invention I have selected and hereinafter described several constructions embodying it.

Figure 1 is a side elevation, partly in section, of an axle housing and driving mechanism embodying my invention. Fig. 2 is a fragmentary longitudinal section of the axle, axle housing and driving mechanism, somewhat enlarged. Fig. 3 is a fragmentary section illustrating the bearings for the rear end of the drive shaft. Figs. 4 and 5 are views similar to Fig. 3 illustrating modifications of the invention.

In the drawings, 2, 3, indicate respectively the shaft sections of the divided driven shaft with the outer ends of each of which a wheel has driving connection. The inner contiguous ends of the shaft sections are connected by a compensating gearing of any approved construction. That which is illustrated in the drawings comprises the bevel wheels 5, each having a driving connection with the inner end of one of said shaft sections, and the bevel pinions 6 between the bevel wheels, mounted upon a shaft 7 which is supported in the differential housing 8. The latter has detachably connected to it a worm gear 9 with which meshes the worm 10 upon the drive shaft 11. The worm 10 is illustrated as suitably broached and the drive shaft 11 is correspondingly splined or feathered. This differential gear as a whole is covered and protected by the housing 12 supported in any approved manner by the framework of the vehicle. The worm, worm gear and differential gearing are so supported that they may as a unit be easily removed from the housing 12. To this end the shaft sections 2 and 3 are easily separable from the gears 5 and capable of being withdrawn endwise from the sleeves 39 through which they extend, and the differential gearing is mounted upon a support that is separable from the other parts of the framework of the vehicle. This support consists of a cap piece 13 adapted to be secured to the housing 12, and to close the opening thereinto through which the transmission gear is inserted and removed. The gear support and bearing piece 13 is preferably an integral casting, suitably shaped, and is secured to the housing 12 by bolts 14. It is formed with pillow blocks or rests 15 in which are mounted the supporting bearings 16 and the thrust bearings 17 which directly support the sleeve portions 19 of the differential housing 8, and indirectly the inner ends of the driven shaft sections. These bearings may be of any suitable type of anti-friction bearing, for illustration the ball bearing type is shown. They are held in place by the cap pieces 18 secured to the pillow block portions 15 of the removable section, 13, of the gearing housing or case. The sleeves 19 of the differential housing ring are preferably stepped, and the supporting bearings 16 occupy the inner and higher—that is, more remote from the axis of rotation—steps, while the bearings 17 occupy the outer and lower steps. An adjusting ring 20 for setting each thrust bearing 17 as well as permitting lateral adjustment of the housing 8 and worm gear 9 is employed and has screw-threaded engagement with the pillow block or rest 15 and the cap 18, as indicated in the drawing. The rest 15 and cap 18 constitute a supporting ring. A lock of any preferred kind, as indicated at 21, is employed for holding the adjusting ring in place. The housing 8 may be adjusted laterally independently of shaft sections 2, 3.

The removable cap piece 13 of the housing is provided with a pair of oppositely extending hubs, 22 and 23, in alinement with each other and disposed to receive the drive shaft 11. The outer end of this shaft lies within the hub 22 which is closed by a dust cap 24. Anti-friction bearings 25, preferably of the ball type, are mounted within the hub 22 and support the outer end of the drive shaft 11, which latter is screw-threaded to receive a nut 26 that is employed for effecting the proper relation between the worm 10 and the bearing 25. The worm is free to move lengthwise of the shaft and to rotate therewith and is mounted between sleeves surrounding the shaft, one, 27, being between one end of the hub of the worm and the nut 26, and the other, 28, between the other end of the hub of the worm and an adjusting nut 29, the latter being screw-threaded upon the drive shaft and held in place by the lock nut 31. 30 indicates an antifriction bearing for the drive shaft which is arranged within the hub 23. It, like the bearing 25, is longitudinally adjustable to a limited extent in its support, and may be of any suitable construction. It engages with the sleeve 28, at one end.

The thrust bearings for the drive shaft are mounted within the hub 23, where they are confined by the nuts 29 and 31 and a cap 32 which closes the end of the hub with which it has a screw-threaded connection so as to be adjustable. The cap is held in the positions to which it may be adjusted by a lock 33, and is provided with a gland 34 surrounding the shaft. The thrust bearing consists of a ring 35, carried by the sleeves or collars 28′, 28ᵃ and being preferably clamped therebetween as indicated in Fig. 3 two rings, 36, 36, supported by the hub 23, and sets of balls, 37. The inner ring 36, is supported by a shoulder 38 formed within the hub 23, and the outer ring, 36, is supported by the adjustable cap 32. It will be seen, by reference to the drawings and from the foregoing description, that the worm 10 can be accurately adjusted along the axis of the shaft so as to mesh to the best advantage with the worm gear 9 and then be secured and supported to run with the least possible friction.

In Fig. 4 there is illustrated a slightly different mounting for the driving shaft 11 within the hub or extension 23. In this modification I employ oppositely disposed anti-friction bearings, or a double bearing, operating both for the purpose of taking the load and the thrust. In this example 35′ is a double surfaced inner bearing element. 36′, 36′ are the races and 37 the balls. 28′ is a collar or sleeve with which the nut 29 engages. Any undesirable lost motion in the innermost bearing of this pair of bearings may be taken up by adjustment of the nut 29, whereas such undesirable lost motion between the parts of the outermost bearing of the pair may be taken up by adjustment of the cap 32.

In the embodiment of my invention just described in place of the opposed anti-friction ball bearings it will be understood that suitable anti-friction roller bearings may be employed as illustrated in Fig. 5.

39, 39, indicate sleeves or tubes surrounding the driven shaft sections 2 and 3. These are stationary being supported at their inner ends by the housing 12 and at their outer ends when in use in any suitable and well known manner. At their outer ends the axle tubes are reduced as indicated at 39′ and upon them are mounted anti-friction bearings 40, 41. On these bearings a hub 42 of a driven wheel 4 is mounted. In order to connect the outer end of a shaft section with the hub of the wheel 4 which it drives I employ a clutch plate 43 secured fast to the shaft, as by a spline or key, and connected with the part 44 of the hub which is shaped to have interlocking engagement with the clutch plate. The clutch plate is easily separated from the hub so that the shaft may be taken out without disturbing the support of the vehicle by the wheels in a manner well known in the art. A cap 45 having screw-threaded engagement with the hub of the wheel covers the end of the shaft and the clutch plate and holds the latter in place in clutching engagement with the hub.

46 indicates, in a general way, a suitable brake mechanism interposed between the wheel and the tube 39, but as this forms no part of the present invention it need not be described in detail.

In order to provide against the lubricant or oil used for lubrication of the gearing within the axle housing running out in the tubes 39 and ultimately finding its way to the brake mechanism at the wheels and also from working its way out of the axle at the ends of the tubes 39, in any manner, I have arranged to have said tubes at their inner ends drawn down so as to closely fit around the adjacent driven shaft section as indicated at 39ᵃ. The extreme inner end of each tube may be formed with a cup-like portion 39ᵇ surrounding the shaft section which extends through it. A suitable packing gland may be interposed between this cup-like portion 39ᵇ and the axle section. For illustration I have shown packing 47 arranged between the axle section, the shoulder 39ᶜ, and the inner wall of the cup-shaped portion 39ᵇ. This packing may be held in position in any suitable manner as by a spring 48 bearing at its inner end against the packing and at its outer end against the washer or collar 49 suitably secured in the outer end of the cup-shaped part 39ᵇ.

My idea for preventing the oil or lubricant from working out along the tubes is more effective than any other of which I am aware and particularly is this true where the lubricant is relatively light and flows readily, for example, such lubricant as is now used in the lubrication of worm gear transmitting mechanism in drive axles or power transmitting mechanisms of the character herein described.

Instead of extending the tubes 39 inwardly into the gear casing, it will be understood that another piece of suitably shaped tubing may be employed which though it would not be a part of the tube 39 would perform the same functions as the inwardly extending part 39ª herein illustrated and described. My idea is to so reduce the space between the tube 39ª and the shaft section which extends through it, that but little lubricant would find its way therethrough notwithstanding the fact that the packing 47 might lose its efficiency as a packing.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

The inner ends of the tubes 39, i. e., inward extensions 39ª, are not rigidly held against lateral movement but being constructed of more or less resilient metal are free to come and go with the inner ends of the drive shaft sections which they surround.

This application presents certain subject-matter in common with my co-pending application Serial No. 794,003, filed October 8, 1913, and that common patentable subject-matter of my invention I have elected to claim in the said co-pending application.

What I claim is:—

1. In mechanism of the class described, driven shaft sections, differential mechanism interposed between said shaft sections, a worm gear for driving said differential mechanism, a housing within which said elements are arranged, a worm arranged within said housing and in mesh with said worm gear, a load bearing within said housing adjacent to one end of said worm, a pair of oppositely disposed combined load and thrust bearings arranged within said housing adjacent to the other end of said worm, a drive shaft for the worm mounted in said bearings and means on said drive shaft for clamping said bearings and worm together.

2. In mechanism of the class described, driven shaft sections, differential mechanism interposed between said shaft sections, a worm gear for driving said differential mechanism, a housing within which said elements are arranged, a worm arranged within said housing and in mesh with said worm gear, a load bearing within said housing adjacent to one end of said worm, a pair of oppositely disposed combined load and thrust bearings arranged within said housing adjacent to the other end of said worm, a drive shaft for the worm mounted in said bearings, and means for adjusting the component parts of each of said combined load and thrust bearings relative to each other within said housing.

3. In mechanism of the class described the combination of a housing, a worm gear rotatably mounted in said housing, a worm for driving said worm gear, a load bearing within the housing adjacent to one end of said worm, bearings within the housing adjacent to the other end of said worm for taking both the load and thrust, a drive shaft for the worm mounted in said bearings, said worm being connected to said drive shaft to rotate therewith and to move longitudinally relative thereto, sleeves on said drive shaft between the ends of said worm and the adjacent bearing, said sleeves being movable longitudinally relative to said drive shaft, said drive shaft being screw-threaded adjacent to the points where it is mounted in said bearing, and nuts engaging the screw threaded portions of said drive shaft and positioning the bearings and the worm on said shaft therebetween.

4. In mechanism of the class described the combination of a housing, a worm gear rotatably mounted in said housing, a worm for driving said worm gear, a load bearing within the housing adjacent to one end of said worm, bearings within the housing adjacent to the other end of said worm for taking both the load and thrust, a drive shaft for the worm mounted in said bearings, sleeves on said drive shaft between the ends of said worm and the adjacent bearing, said drive shaft being screw-threaded adjacent to the points where it is mounted in said bearing, nuts engaging the screw-threaded portions of said drive shaft and positioning the bearings and the worm on said shaft therebetween, and a cap adjustably mounted in the casing surrounding the drive shaft and engaging the adjacent bearing for adjusting it within the casing.

5. A housing, differential driving mechanism within said housing, a pair of driven shaft sections connected at their inner ends to said differential mechanism and extending in opposite directions through said housing, axle tubes surrounding said drive shaft sections, connected to said housing and extending freely into the interior thereof, the inner section of each tube being free to move within the housing and reduced in diameter to closely fit about the drive section which is normally extended through it, and packing interposed between the inner end of said tube and the said drive shaft.

6. A housing for a power transmitting mechanism comprising an enlarged central section adapted to receive the power transmitting gearing and tubes extending in either direction from said housing and also into the housing, the inner section of each of said tubes being free to move within the housing and reduced in diameter to closely fit about the drive shaft which is to extend through it, and an annular packing arranged in the inner end of each of said tubes.

7. A housing for a power transmitting mechanism comprising an enlarged central section adapted to receive the power transmitting gearing and tubes extending in either direction from said housing and also into the housing, the inner section of each of said tubes being free to move within the housing and reduced in diameter to closely fit about the drive shaft which is to extend through it, and at its extreme inner end being enlarged to form a packing cup, and an annular packing arranged in said cup.

8. In a mechanism of the class described, a housing, differential driving mechanism within said housing, a pair of driving shaft sections connected at their inner ends to the said differential mechanism and extending in opposite directions through said housing, axle tubes surrounding said shaft sections, connected to said housing and extending freely into the interior thereof, the inner end of each tube being free to move within the housing and a lubricant guard interposed between the said inner end of each tube and the adjacent shaft section.

9. In a mechanism of the class described, the combination of a housing, a worm gear rotatably mounted in said housing, a drive shaft, a worm rotatably connected to said drive shaft, longitudinally movable relative thereto and meshing with said worm gear, sleeves at either side of said worm on the said drive shaft and longitudinally movable relative to said drive shaft, anti-friction bearings adjacent to the outer ends of said longitudinally movable sleeves, and means carried by said drive shaft for positioning said worm, sleeves and anti-friction bearings thereon.

In testimony whereof I affix my signature, in the presence of two witnesses.

WALTER C. BAKER.

Witnesses:
 FRED C. DORN,
 EDWARD R. ALEXANDER.